Dec. 25, 1956  W. M. SCOTT, JR  2,775,642
HALF CIRCULAR BUS BRACKET
Original Filed May 9, 1950  3 Sheets-Sheet 1
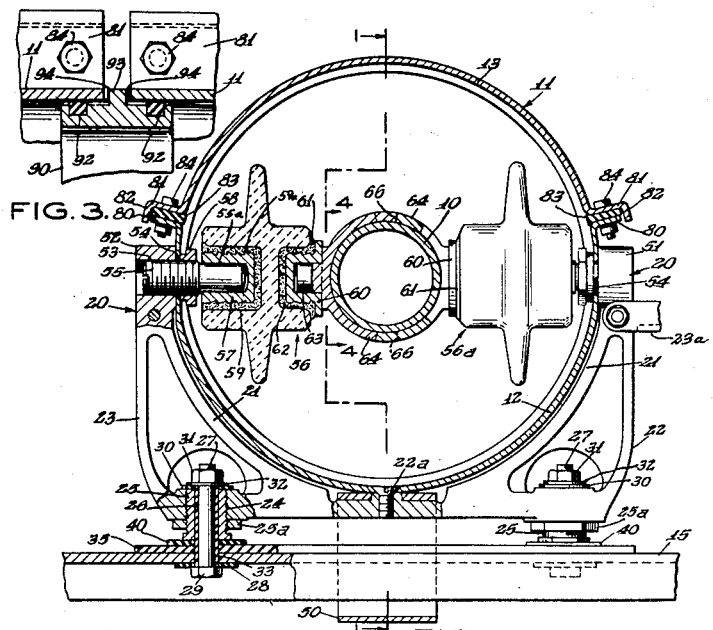
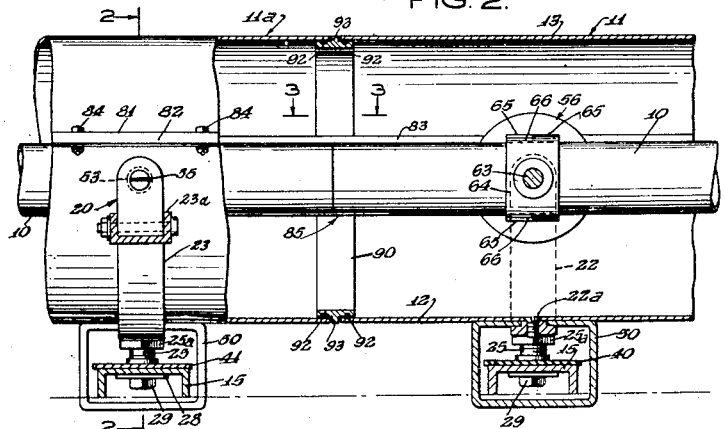
INVENTOR
WILLIAM M. SCOTT, JR.
BY Ostrolenk & Faber
ATTORNEYS

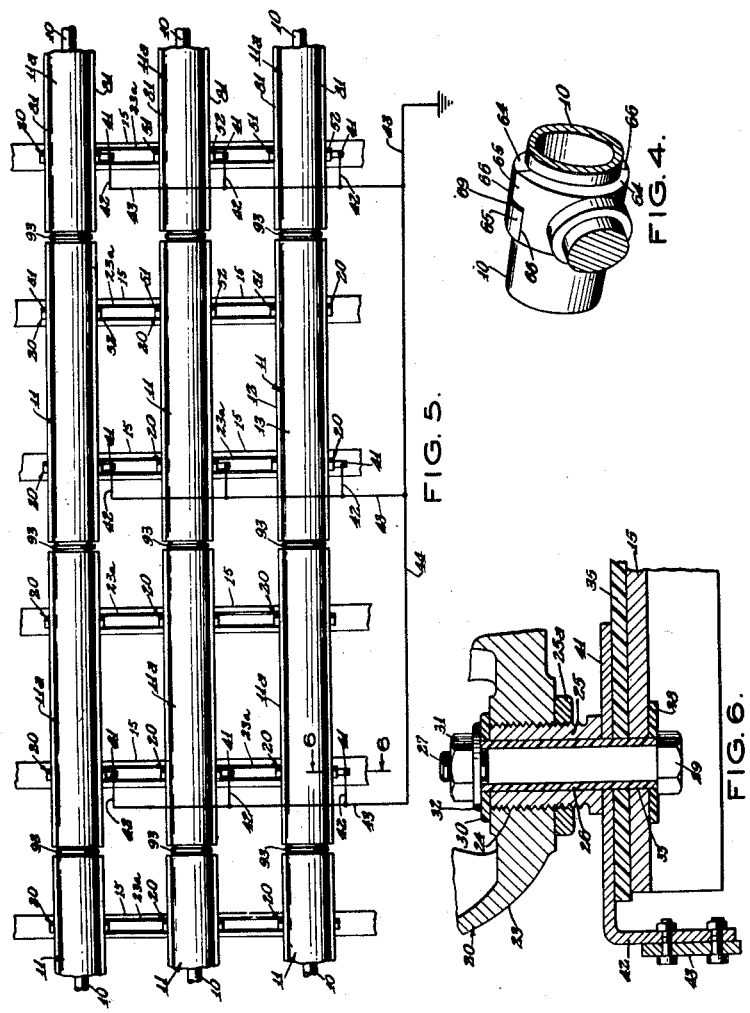

INVENTOR
WILLIAM M. SCOTT, JR.
BY Ostrolenk & Faby
ATTORNEYS

United States Patent Office 2,775,642
Patented Dec. 25, 1956

2,775,642

HALF CIRCULAR BUS BRACKET

William M. Scott, Jr., Bryn Mawr, Pa., assignor to I-T-E Circuit Breaker Company, Philadelphia, Pa., a corporation of Pennsylvania Original application May 9, 1950, Serial No. 160,899. Divided and this application December 31, 1952, Serial No. 328,884

7 Claims. (Cl. 174—99)

This application is a division of application S. N. 160,899 filed May 9, 1950, now abandoned, and relates to electrical bus structures and more particularly to an isolated phase bus housing wherein a simplified and relatively inexpensive support structure is provided and wherein also assembled bus and housing sections may be shipped for connection and installation as prefabricated units.

Heretofore in the construction and operation of isolated phase enclosed buses of a polyphase system the buses of each phase have primarily been held in position with their respective housings by three or more insulators angularly disposed with respect to each other about the bus and held in position by annular bus rings which also secure and support the bus runs or housings.

These annular rings are axially spaced from each other and as stated above each carry three or more insulators through which the stresses set up in the bus when current flows therein are transmitted to the annular rings and thence to the mechanical or structural members to which the rings are secured.

While three or more insulators are desirable for better protection, particularly in vertical runs, there are many situations where I have discovered two insulators mounted substantially 180° apart, i. e., on diametrically opposite sides of the bus will provide all of the usually required bus support.

Thus, when buses of a three phase operation are arranged in parallel with the axis of all the buses in one plane, the opposing forces set up by the buses when currents flow are in a direction transverse to the axis of the buses and generally in the plane in which the axis of the three buses lie.

Insulators mounted with their longitudinal axis in this plane of the three bus axis with their longitudinal axis transverse of the longitudinal axis of the buses, i. e. the insulator axis extending from the axis of one bus to the axis of the next bus and at right angles to the bus axis, will accordingly be placed under compression as a result of the forces between the buses.

In addition to these forces, which are as the square of the current, there is also the much lesser force of the mass of the bus structure in a vertical direction or at right angles to the longitudinal axis of the insulator and set up a cantilever stress on the insulators. While this is undesirable, it is of minor proportion.

Inasmuch as I can thus support the bus with two insulators diametrically opposed on said bus with respect to each other, I can use a ring for supporting the two insulators which extends only through approximately 180°.

By employing a ring extending only part way around, i. e. not being continuous, the problem of eddy current flow induced therein by the changing flux of the system, is eliminated.

Thus it is no longer necessary to use expensive non-magnetic rings such as of bronze as heretofore used. Accordingly, I can and prefer to use cast iron semicircular rings.

Accordingly an object of my invention is to provide a novel bus system in which only two insulators are employed for each ring section.

A further object of my invention is to provide a novel system in which two insulators are mounted on and supported by a semicircular ring.

Still a further object of my invention is to provide two insulators for each supporting ring on opposite sides of the bus and arranged to carry the forces set up by current flow in the buses by compression.

A further object of my invention is directed to the utilization of U-shaped supports extending over a limited area rather than over a full circle in order to provide an appropriate cradle or support for the bus housing.

Still a further object of my invention is the provision of simplified inexpensive support structures for an isolated phase bus housing.

Another object of my invention is the utilization of half ring supports for the bus housing.

A further and corollary object of my invention is the provision of a novel system utilizing a limited number of insulators at each support station of the bus, preferably two insulators being used in each support station and providing, however, all of the support required both for physically carrying the bus bar as well as for reinforcing it against deflection owing to magnetic stresses which may be set up under certain conditions.

In accordance with one form of my invention, I mount my supporting ring for the insulators around the outside of the bus housing. In accordance with this arrangement the buses, housing, rings and insulators may be made in sections ready for assembly as a circuit at the customer's location.

The foregoing and many other objects of my invention will become apparent in the following description and drawings in which:

Figure 1 is a side view partly in longitudinal cross-section showing my novel bus housing and bus support structure.

Figure 2 is a cross-sectional view taken on line 2—2 of Figure 1 looking in the direction of the arrows and showing one of the support sections for my novel bus housing.

Figure 3 is a cross-sectional view taken on line 3—3 of Figure 1 looking in the direction of the arrows.

Figure 4 is a side view in perspective partly in cross-section taken on line 4—4 of Figure 2 looking in the direction of the arrows and showing the manner in which the insulators carry the clamps which in turn support the bus bar itself.

Figure 5 is a top view showing a complete bus run for a three phase isolated phase bus structure.

Figure 6 is a fragmentary enlarged sectional view on line 6—6 of the lower left-hand corner of Figure 5.

Figures 7, 8:
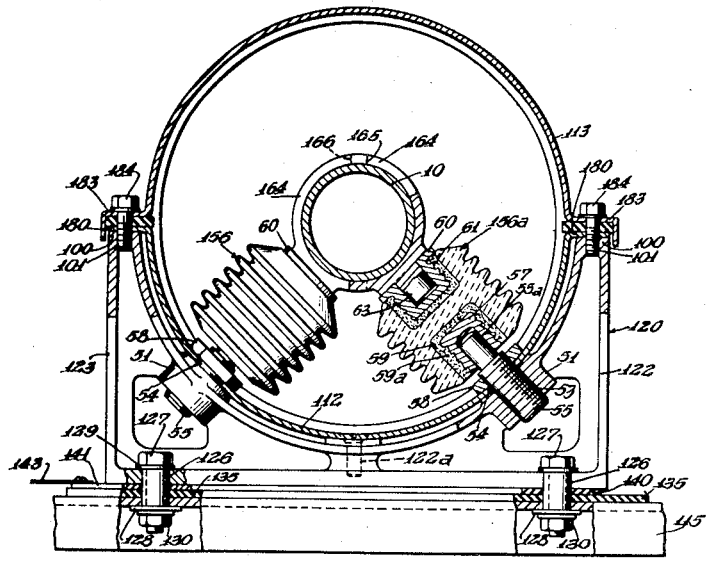
Figure 7 is a cross-sectional view corresponding essentially to that of Figure 2 showing a modified form of construction.
Figure 8 is also a cross-sectional view corresponding substantially to that of Figures 2 and 7 showing a further modified form of construction.

Referring to Figures 1 to 6, each of the buses 10 in the isolated phase bus structure is supported within the housing 11. The housing 11 in the form here shown comprises a lower housing section 12 and an upper housing section 13. These housing sections are here referred to as lower and upper in order to distinguish them from each other and usually the section 13 will be the upper section of the housing 11 of the bus run.

However, where the bus run is vertical, the utilization of the terms lower and upper will refer primarily, respectively, to the supported section 12 and the removable cover section 13. Also, in certain instances it may be desirable particularly in overhead bus runs to invert the structure so that the "upper" section 13 comprising the cover will actually be on the underside.

Also, as will be apparent hereinafter, although two semi-cylindrical housing sections are here shown, a tubular or continuous cylindrical housing section may be employed as shown in my Patent 2,396,131.

The bus run is supported on appropriate structural members which in the figures (2 and 5) are shown as the upper sections of beams 15, 15, the beams being in turn supported at an appropriate position on desired structural members.

Each prefabricated section of the bus comprises as shown particularly in Figure 2 two half ring support members 20, 20 carrying a housing section 11 which extends beyond each of the support members 20, 20 with appropriate means being provided to interconnect each bus assembly at longitudinally adjacent bus assemblies. That is, the ends of buses 10 at each assembly will be provided with appropriate pigtails for connection to the longitudinally adjacent bus and the ends of the housings 11 will, as hereinafter described, be provided with appropriate connecting members so that a continuous dust-excluding housing will be formed.

Each of the half rings 20 as shown particularly in Figures 1 and 2 comprises an arcuately shaped cradle section 21 adapted to receive the lower housing section 12. The arcuately shaped cradle section 21 also is provided with a pair of legs 22, 23. Each of the legs 22, 23 has a tapped opening 24 in which is threaded the hollow metal sleeve 25.

Insulating bushing 26 is then inserted in the opening of the hollow metal sleeve 25. Sleeve 25 is secured by clamping nut 25a. A bolt 27 is then passed through the insulating bushing 26 with an insulating washer 28 being provided beneath the head 29 of the bolt 27 and an insulating member 30 being provided beneath the nut 31 and washer 32 on the bolt 27.

The bolt 27 passes through bushing 26 which goes through an opening 33 in the beam 15 and then through the metal insert 25—the nut 31 clamping against the insulating member 30 on the upper side of the ledge support 23 and securing the leg 23 in place.

This type of securement is used for both legs 22 and 23 of the support member 20 in order to position the support member 20 on the structural support elements 15. An insulating plate 35 is provided across the support elements so that the metal insert 25 on each side is at all times fully insulated from ground.

The metal sleeve 25 provides for appropriate adjustment of the height of legs 22 and 23 so that the support member 20 will be level and will be properly adjusted on its support.

As shown in Figure 5, one support member 20 for each prefabricated bus assembly is to be connected to ground while the other support element is to be insulated. This is done so that the bus housing may be grounded but also so that there will be no short circuit path through the bus housing from one of its support members to the other support member.

Each of the prefabricated bus sections is insulated from the adjacent bus section in the manner hereinafter described.

In order to achieve the grounding of the bus support member 20 while at the same time making it possible to insulate the support members which are to be insulated, a common mounting means is provided illustrated in operation in Figures 2 and 6.

In Figure 2 the leg 23 of the support member 20 is shown insulated from ground by the insulating plate 40 inserted between the metal insert 25 and the base insulating strip 35.

It will thus be seen that the bushing 26, the insulating washers 30 and 28, the insulating plate 35 and the insulating strip 40 serve to isolate leg 23 from the base structure 15.

The same elements are utilized in the leg 22.

In Figure 6 the structure is similar except that the ground bus lead has been substituted for the insulating washer or strip 40 of Figure 2. The ground bus lead 41 is metallic and is connected by leads 42 and 43 to ground 44.

Thus, in the embodiment shown in Figure 5, alternate legs of the members 20, 20 utilize the metal ground connector 41, and alternate members 20 utilize the insulating strip 40.

As a result, the eddy current which develops in any one housing section and which, because of the insulated support at the right hand end, finds a ground which extends from the housing to the leg 23 of the support member 20, through the metal insert 25 directly, and then from the base of the metal insert to the ground connector 41. Because the other supporting leg is insulated, it cannot find a direct or circulating path to another section or a return path to the same housing section.

By utilizing the ground connector 41 at desired locations and the insulating washer or strip 40 at other desired locations, one leg of one of the supports of each prefabricated bus assembly may be connected to ground while all of the other legs are insulated from ground.

The housing section 12 is secured to the base of the cradle 21 of the two housing support members 20 with which it operates by a bolt 22 passing through the housing section 12 and into an appropriate tapped opening in the cradle section 21 of the bus support 20.

An appropriate metal shield 50 may be provided at the center of the base cradle 21 surrounding the beams 15 at that point for providing a magnetic shield for the structural members at the point of support to thereby reduce the eddy current flow in the structural members.

Non-magnetic braces 23a (Figures 1, 2 and 5) may be provided to brace the bus phases additionally against collapse toward each other. The ends 51, 52 of the support members are provided with tapped openings 53 on each side into which may be threaded the threaded ends 55 of insulators 56. Insulators 56 have a wide annular extension to shield the support structure and increase the strike over distance from the bus. The ends 55 of inserts in insulators 56 pass through openings 54 in the housing section 12 on each side and the housing section 12 on each side is further clamped to the support by the lock nuts 58 which are threaded back on the threaded ends 55 to perform the clamping operation shown at the left center of Figure 2.

The reduced diameter 55a of the threaded inserts 55 of the insulators 56 are longitudinally slidable in cups 57 which are held by cement 59a in the recesses 59 at the outer ends of each insulator 56.

The longitudinal adjustment of the threaded insert 55 in the tapped opening 53 of the support determines the longitudinal position of insulator 56. The opposite end of each insulator is provided with a cup 60 secured by cement 61 in recess 62 of the insulator 56. The cup 60 receives the extension 63 of the half clamping ring 64.

The insulator 56a is similarly constructed. The half clamping rings 64 on each side are arranged so that they may meet to support the bus 10. Each end of the half clamping rings 64 as shown in Figure 4 is provided with an extension 65 and recess 66 matching with a corresponding extension and recess in the opposite clamping ring so that the meeting edges at 69 will serve to retain the clamping rings together and prevent movement in a direction to separate them.

The half clamping rings 64 are so dimensioned that when they meet they will firmly support the bus 10 while permitting longitudinal sliding motion thereof.

In any bus length it is desirable that provision be made for expansion and contraction of the bus owing to thermal conditions, while at the same time the bus be held securely at one end. Thus, provision may be made for holding the bus stationary at one of the clamps.

After the bus 10 has been positioned by the insulators and all of the operations are completed for connecting the bus lengths together, grounding the appropriate legs of the supports and all other connecting operations required have been performed, the housing cover 13 may be secured in position.

For this purpose, the lower housing section 12 is provided with a longitudinal flange 80 on each side and the upper housing section 13 is provided with a matching longitudinal flange 81 on each side, having also the downwardly turned extension 82.

A dust-excluding gasket 83 is provided between meeting flanges 80 and 81 and securing bolts 84 are passed through registering openings in the flanges 80 and 81 and the gasket 83; the downwardly extending flanges 82 serve further to protect the gasket 83 and increase the dust-proof qualities of the housing.

Each of the prefabricated sections having two supports 20 may be shipped as a complete assembled unit with a bus in place thereon to be connected to the bus of the adjacent unit, or each of the sections may be shipped as a completely assembled unit with, however, the bus omitted from the assembly so that a longer bus traversing two or three or more housing units may be placed in position at the point of assembly.

This condition is shown in Figure 1 where the bus passes from housing unit assembly 11 to housing unit assembly 11a. Where each sub-assembly is shipped as a complete unit with the bus in place, then the bus will terminate at the region 85 and pigtail connections will be provided at the region 85 between longitudinally adjacent buses on adjacent housings 11 and 11a connected to the connecting ring 90 as shown in Figures 1 and 5.

After the lower sections 12 are assembled on the supporting ring 20 and before the bus 10 is in place, the ring 90 is positioned at the longitudinal boundary between longitudinally adjacent housing sections 11 and 11a. Then after all of the assembly operations are completed, the top cover sections 13 are moved down into position on the lower housing sections 12 with the internal ring 90 being held so that it will be positioned as shown in Figures 1 and 5 when the closure of the housing is completed.

From the above, it will now be clear that the semi-cylindrical sections of the housings 11 and 12 may, if desired, be enclosed by a continuous cylindrical housing.

As shown in Figures 1 and 3, the ring 90 is provided with dust-excluding gaskets 92, 92 positioned in appropriate grooves and a positioning annular extension 93 so that the ring 90 will be properly positioned with respect to the laterally adjacent housing sections 11 and 11a, and an insulating annular strip 94 may be provided at least at one side and preferably at both sides so that the laterally adjacent housing sections 11 and 11a are insulated from each other preventing the circulation of any currents throughout the bus housing.

In the modified form shown in Figure 7, the insulators are shown displaced from each other by some angle less than 180° as is the case in Figures 1 to 6. The insulators in the housing structures of Figures 1 to 6 serve to support the bus 10 physically. Also, their arrangement is such that maximum compressing forces are provided to resist deflection laterally owing to magnetic forces due to current flow in adjacent phases of a polyphase system as shown in Figure 5.

The angular arrangement of the structures of Figures 7 and 8 of the insulators actually places one of the insulators under compression and the other insulator under tension to provide substantially equal resistance against a lateral deflection of the bus under magnetic stresses while, at the same time, providing a firm physical support wherein both insulators are under compression and no bending movement is imposed on the insulator by the load of the bus 10.

In the structure of Figure 7, the support member 120 is provided with legs 122, 123. The lower housing section 112 is secured to the base of the support by the bolt 122a. The legs 122 and 123 are secured to the support member 115 in substantially the manner previously described.

An insulating bushing 126 passes through registering openings in the leg 123 and the support member 115 and a bolt 127 passes through the insulating bushing 126, being provided with insulating washers 128 and 129 so that the bolt 127 and its nut 130 are isolated from any current path from leg 123.

An insulating strip 135 is mounted beneath the support member 120 thereby insulating the support member 120 at both legs 122 and 123 from the support 115. An additional insulating strip 140 is provided between the paths of support member 120 and the insulating strip 135.

Where it is desired to effect a connection to a ground bus, then as shown at leg 123, the insulating washer or strip 140 shown at leg 122 is replaced by a metallic bus connection 141 in an electrical contact with the under surface of support 120 and connected by an appropriate lead 143 to a ground bus.

The insulators 156 and 156a are connected through the lower housing 112 to the support member 120 in the manner previously described in connection with Figure 1 and consequently the same reference numbers are utilized for the similar parts.

The half clamping rings 164 on each of the insulators 156 and 156a operate in the same manner as previously described in connection with Figure 2 but are so arranged that instead of extending for approximately 90° on each side of the point of securement to the insulator, one of the arms of each half clamping ring 164 extends over a greater arc than the other arm owing to the novel angular arrangement of the insulators.

The flange 180 on each side of the lower housing section 112 rests on the ledge 100 on each side of the support 129, the said ledge 100 being provided with a tapped opening 101 to receive the securing bolt 184. Securing bolt 184 passes through flange 183 on each side of the upper housing section 113 through the gasket between flanges 183 and 180 and into the tapped opening 101 at the ledge 100, thereby securing the housing cover section 113 to the lower housing section 112 and completing the integration of the entire structure.

In Figure 8 I have shown a further modified form wherein the utilization of the half ring construction of the unit 20 of Figures 1 to 6 or the unit 120 of Figure 7 is dispensed with, the support member 220 comprising a base 200 and a pair of upwardly directed arms 201 and 202.

The upwardly directed arms 201, 202 correspond to the legs 22 and 23 of the support member 20 or to the legs 122 and 123 of the support member 120 and are secured to the beam 215 in substantially the manner above-described in connection with Figure 7.

The members 201, 202 have pivotally secured thereto the support legs 222 and 223, which legs 222 and 223 in turn are provided with the support structure of the type previously described in connection with insulators 156 and 156a of Figure 7, the insulators 256 and 256a of Figure 8 being supported on legs 222 and 223 in the manner above described for Figures 7 and 2 and supporting the bus 10 in the manner already described in connection with Figure 7.

Thus, the lower housing section 212 is secured to the beam 200 not only by the bolt 22a but also by the lock nut 58 as shown. The lower housing section 212 is integrated with the upper housing section 213 by the bolts 84, 84 on each side and flanges 81 and 80 on each side in the manner already described in connection with Figure 2.

The basic difference between the modification of Figure 8 and that of Figure 7 is that the housing section 212 is almost entirely self-supporting, while in the modification of Figure 7 as also in the primary structure of Figure 1, the lower housing section is fully supported.

Thus, the modified form of housing of Figure 8 is more readily adapted to smaller bus structures or to bus structures where it is economic to make the lower housing section 212 virtually self-supporting.

While the legs 222 and 223 may be supported in a swivel manner on the support legs 201, 202 of the support member 220, this swivel is about a bolt 210 on each side having an appropriate nut which may be tightened after the swivel has been adjusted.

Thus, some compensation may be made in the exact relative angle between insulators 256 and 256a where required, and this compensation when effected may be securely maintained by tightening the nuts on the bolts 210.

By this means, therefore, a simplified relatively inexpensive support for the housing of the bus structure is obtained, and a bus structure is provided which may be shipped in relatively long prefabricated sections to be interconnected on the job. Each entire individual section may be fully prefabricated or the bottom portion of the housing and its supports may be prefabricated as a unit assembly for integration with a longer bus length passing through two, three or more housing sections.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a sectionalized bus system to be secured to a structural member, a prefabricated section comprising a first bus housing member, a second bus housing member, said first and second housing members when joined forming a cylindrical closure for a bus, said prefabricated section further including a pair of substantially 180° cast iron supports, each of said cast iron supports comprising a pair of legs arranged to extend to and be secured to the structural member and a cradle section for removably receiving one of said housing members, two pairs of diametrically opposite insulators engaging and supporting the bus at opposite sides thereof, said cast iron support for each pair of insulators extending from a point slightly beyond the longitudinal axis of one insulator around to and slightly beyond the longitudinal axis of the second insulator, adjustable members each mounted in said supports and extending through one of said housing members to said insulators for securing said insulators to said supports and providing axial adjustment of said insulators, and additional adjustable members for adjustably securing said legs to said structural members to permit angular positioning of said supports with reference to said structural members.

2. In a sectionalized bus system to be secured to a structural member, a prefabricated section comprising a first bus housing member, a second bus housing member, said first and second housing members when joined forming a cylindrical closure for a bus, said prefabricated section further including a pair of substantially 180° cast iron supports, each of said cast iron supports comprising a pair of legs arranged to extend to and be secured to the structural member and a cradle section for removably receiving one of said housing members, two pairs of diametrically opposite insulators engaging and supporting the bus at opposite sides thereof, said cast iron support for each pair of insulators extending from a point slightly beyond the longitudinal axis of one insulator around to and slightly beyond the longitudinal axis of each of said pairs of insulators, adjustable members each mounted in said supports and extending through one of said housing members to said insulators for securing said insulators to said supports and providing axial adjustment of said insulators, the other of said housing members being removably supported on said one of said housing members, and additional adjustable members for adjustably securing said legs to said structural members to permit angular positioning of said supports with reference to said structural members.

3. In a sectionalized bus system to be secured to a structural member, a prefabricated section comprising a first bus housing member, a second bus housing member, said first and second housing members when joined forming a cylindrical closure for a bus, an insulation band extending between each prefabricated section for insulating adjacent sections from each other, said prefabricated section further including a pair of substantially 180° cast iron supports, each of said cast iron supports comprising a pair of legs arranged to extend to and be secured to the structural member and a cradle section for removably receiving one of said housing members, a grounding connection to one of said supports in each section and an insulation mounting for the other of said supports in each section to prevent circulating currents, two pairs of diametrically opposite insulators engaging and supporting the bus at opposite sides thereof, said cast iron support for each pair of insulators extending from a point slightly beyond the longitudinal axis of each of said pairs of insulators, adjustable members each mounted in said supports and extending through one of said housing members to said insulators for securing said insulators to said supports and providing axial adjustment of said insulators, and additional adjustable members for adjustably securing said legs to said structural members to permit angular positioning of said supports with reference to said structural members.

4. In a sectionalized bus system to be secured to a structural member, a prefabricated section comprising a first bus housing member, a second bus housing member, said first and second housing members when joined forming a cylindrical closure for a bus, an insulation band extending between each prefabricated section for insulating adjacent sections from each other, said prefabricated section further including a pair of substantially 180° cast iron supports, each of said cast iron supports comprising a pair of legs arranged to extend to and be secured to the structural member and a cradle section for removably receiving one of said housing members, a grounding connection to one of said supports in each section and an insulation mounting for the other of said supports in each section to prevent circulating currents, two pairs of diametrically opposite insulators engaging and supporting the bus at opposite sides thereof, said cast iron support for each pair of insulators extending from a point slightly beyond the longitudinal axis of one insulator around to and slightly beyond the longitudinal axis of the second insulator, adjustable members each mounted in said supports and extending through one of said housing members to said insulators for securing said insulators to said supports and providing axial adjustment of said insulators, and additional adjustable members for adjustably securing said legs to said structural members to permit angular positioning of said supports with reference to said structural members, and a metal shield at the center of the cradle and surrounding the structural member for reducing eddy currents in said structural member.

5. In a sectionalized bus system to be secured to a structural member, a prefabricated section comprising a first bus housing member, a second bus housing member, said first and second housing members when joined forming a cylindrical closure for a bus, said prefabricated section further including two pairs of angularly disposed insulators engaging and supporting the bus, two pairs of supporting legs, one supporting leg for each of said insulators, a leg supported in a swivel manner on each of said supporting legs, an adjustable connection from each of said legs through said first bus housing member to the associated insulator for axially adjusting said insulators, said insulators being adjusted angularly on said swivel connection, a nut on said swivel connection for locking said legs in position, and means for removably mounting said second housing member said first housing member.

6. In a sectionalized bus system to be secured to a structural member, a prefabricated section comprising a first bus housing member, a second bus housing member, said first and second housing members when joined forming a cylindrical closure for a bus, said prefabricated section further including a cast iron support, said cast iron support comprising a pair of legs arranged to extend to and be secured to the structural member and a cradle section extending for substantially 180° for removably receiving one of said housing members, a pair of angularly disposed insulators engaging and supporting the bus, said cast iron support extending for a distance substantially half the circumference of the housing, adjustable members mounted in said support and extending through one of said housing members to said insulators for securing said insulators to said support and providing longitudinal adjustment of said insulators, and additional adjustable members for adjustably securing said legs to said structural members to permit angular positioning of said support with reference to said structural member.

7. In a sectionalized bus system to be secured to a structural member, a prefabricated section comprising a first bus housing member, a second bus housing member, said first and second bus housing members when joined forming a cylindrical closure for said bus, support means for said prefabricated section, said support means comprising a pair of legs arranged to extend to and be secured to said structural member, a pair of angularly disposed insulators engaging and supporting said bus, an adjustable member mounted in said support means and extending through one of said housing members to said insulators for securing said insulators to said support means, and additional adjustable members for adjustably securing said support means to said structural member to permit positioning of said support means with respect to said structural member.

References Cited in the file of this patent
UNITED STATES PATENTS

| | | |
|---|---|---|
| 917,785 | Mershon | Apr. 13, 1909 |
| 2,313,972 | Rugg | Mar. 16, 1943 |
| 2,396,131 | Scott | Mar. 5, 1946 |
| 2,531,017 | West | Nov. 21, 1950 |
| 2,570,885 | Swerdlow | Oct. 9, 1951 |